United States Patent [19]

Jeppsson

[11] 4,212,409

[45] Jul. 15, 1980

[54] CONTAINER CLOSURE MEMBERS

[75] Inventor: Jan-Bertil Jeppsson, Lomma, Sweden

[73] Assignee: AB Akerlund & Rausing, Sweden

[21] Appl. No.: 28,476

[22] Filed: Apr. 9, 1979

[30] Foreign Application Priority Data

Apr. 10, 1978 [SE] Sweden ................................ 7803975
May 30, 1978 [SE] Sweden ................................ 7806216

[51] Int. Cl.² ............................................. B65D 41/32
[52] U.S. Cl. .................................. 220/276; 220/270;
215/256
[58] Field of Search ............... 220/260, 270, 266, 276;
229/43 R; 215/253, 256, 258

[56] References Cited

U.S. PATENT DOCUMENTS

| 3,276,616 | 10/1966 | Lurie ..................................... 220/276 |
| 3,981,412 | 9/1976 | Asmus .................................... 215/256 |
| 4,046,282 | 9/1977 | Ruch .................................. 215/256 X |
| 4,103,802 | 8/1978 | Piltz et al. ........................ 220/270 X |
| 4,144,994 | 3/1979 | Brickeen, Sr. .................. 220/276 X |

Primary Examiner—George T. Hall
Attorney, Agent, or Firm—Lerner, David, Littenberg & Samuel

[57] ABSTRACT

A closure member is provided for closing a container opening wherein the closure member includes a central closure panel, a circumferential rim, and a circumferential edge flange having a circumferential line of weakness about which the edge flange can be folded to abut the outer surface of the container.

14 Claims, 18 Drawing Figures

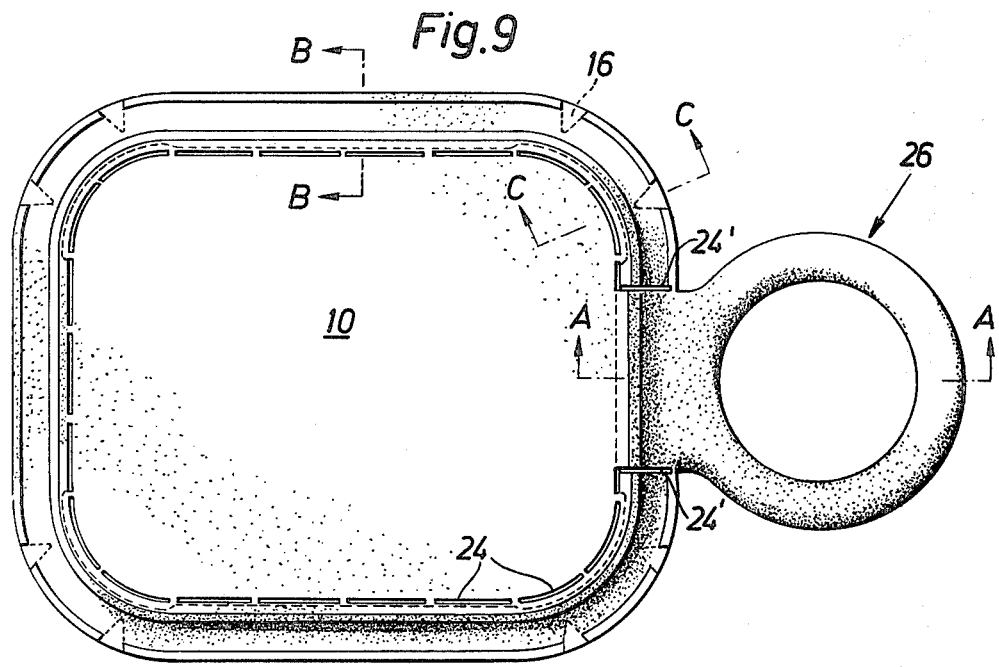
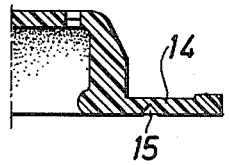
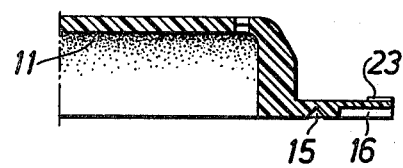
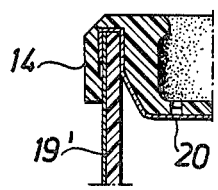

CONTAINER CLOSURE MEMBERS

The present invention relates to closure members for closing container openings bounded by an upstanding edge. It provides a closure member of the kind integrally formed from plastics material and having a closure panel with a circumferential rim for abutting the internal surface of the upstanding edge of the container opening.

There are a number of advantages in integrally forming closure members from plastics materials. In particular, the freedom of choice as to design and material is large; the procedure is not labour-intensive; the energy consumption is moderate; and the production speed is acceptable. However, there are certain problems with this technique such as, for instance, inherent material strains resulting in form instability. For this reason it is necessary to try to find as "clean" construction outlines as possible where measures of a prophylactic nature have been taken to eliminate or at least reduce the risk of material strains. Said measures must not detract from such desired characteristics of the closures as, for example, acceptable tightness, stacking facility and resistance against internal overpressure.

The object of the present invention is therefore to provide closures where prophylactic measures have been taken against the problem of material strains whilst retaining the advantages which are known per se for closures of the kind referred to.

According to the present invention there is provided a closure member for closing a container opening bounded by an upstanding edge, said member being integrally formed of plastics material and comprising a closure panel with a circumferential rim for abutting the internal surface of said upstanding edge, characterised in that said member has a circumferential edge flange delimited at its inner edge by a circumferential line of weakness along which the flange can be folded to abut the outer surface of said upstanding edge and in that the flange has cut-out portions to permit the folded flange to conform to said outer surface. The term "line of weakness" as used in this specification (including the claims) means a line of reduced strength and, in the context of delimiting the edge flange, will usually, but not necessarily be provided by a groove.

Advantageously, the closure member is injection moulded especially from a thermoplastics material. Suitable thermoplastics materials include polyolefins, for example polypropylene and high-density polyethylene, and polyvinyls, for example polyvinylchloride.

Preferably, the edge flange is substantially planar and is located substantially parallel to the closure panel.

It is also preferred that the closure panel is countersunk and the rim has at least one circumferentially extending inner rib. The purpose of the rib or ribs is to provide for denesting-free stacking of the closure members and to facilitate such stacking it is further preferred that the rim is of reduced thickness at its lower end to provide an abutment surface for resting against the rib(s) of an underlying identical closure member. Conveniently, said abutment surface is provided by an external bevel at the lower outer edge of the rim.

Advantageously, the thickness of the edge flange is relatively small while the portion of the rim intended to abut against the container is substantially thicker (in the radial direction) than the edge flange. This increases the resistance of sealing of the closure member to the container to internal over-pressure and also to external impact.

Preferably, the folding line of weakness comprises a groove having a V-shaped cross-section, whereby, when the flange is in a folded position, the opposed groove surfaces adopt a substantially co-planar configuration. This gives an attractive and resistant design of closed container.

The cut-out portions in the edge flange preferably comprise a number of V-shaped notches extending into the flange from the outer edge thereof and with a thin web of the plastics material connecting the opposed groove surfaces. This arrangement is primarily intended to protect a sealing lining, for example a foil of aluminum, attached to the bottom of the closure member.

The sealing lining extends beyond the inner edge of the edge flange in order to be folded against the outside of the container together with the edge flange. Preferably, the edge flange has a circumferential lower rib at its outer edge to compensate for the sealing lining thickness and protect the outer edge of said lining.

In a preferred embodiment, the closure member includes a circumferential line of weakness for removal of the closure panel to open the container opening closed by the member. This line of weakness can be arranged along the outer edge of the closure panel just inside the circumferential rim. Alternatively, the line of weakness can be located between the rim and the edge flange. A grip tongue can be formed integrally with the closure panel and separated therefrom by further lines of weakness except for a bridging portion or portions whereby the closure panel can be removed on pulling the grip tongue. In an alternative construction, an external grip ear can be attached to the closure panel with further lines of weakness delimiting the grip ear from the circumferential rim and communicating with the closure panel lines of weakness whereby the closure panel can be removed by pulling the grip ear.

The following is a description, by way of example only and with reference to the accompanying drawings, of four closure members of the present invention. In the drawings:

FIG. 9 is a bottom view of a closure member in accordance with a further embodiment of the invention;

FIG. 10 is a cross-section on the line A—A in FIG. 9;

FIG. 11 is a cross-section on the line B—B in FIG. 9;

FIG. 12 is a cross-section on the line C—C in FIG. 9;

FIG. 13 is a cross-sectional view of part of a container closed by the closure member of FIG. 9;

Figure 1:
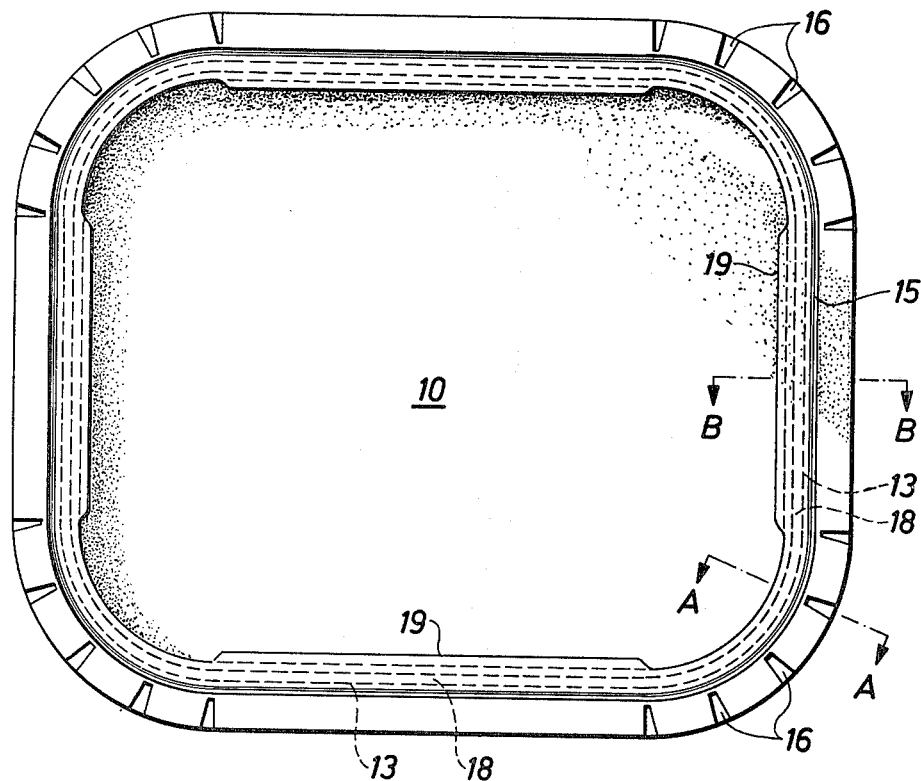
FIG. 1 is a top view of a closure member in accordance with one embodiment of the invention.
Figure 2:
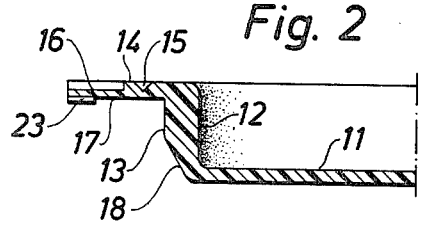
FIG. 2 is a cross-section on the line A—A in FIG. 1.
Figure 3:
FIG. 3 is a cross-section on the line B—B in FIG. 1.

Referring first to FIGS. 1 to 4, a closure member generally denoted at 10 in FIG. 1 comprises a closure panel 11 and a circumferential rim 12. This rim basically consists of an upright part 13 and a narrow perpendicular flange which is delimited from a coplanar edge flange 14 by a circumferential groove 15 having "V"-shaped cross-section. In the corner areas of the flange 14 there are "V"-shaped notches 16. In the embodiment shown said notches are not throughgoing but as appears from FIG. 2, there is left a thin web 17. The section A—A in FIG. 2 further shows that the bottom edge of the rim is bevelled at 18. The object of this bevelled part 18 is to form an abutment surface against a rib 19 on an underlying closure member in a pile of identical closure members. The rib 19 extends inwardly at the upper edge of the rim 12 and is interrupted at the corner areas.

The closure member 10 is manufactured from, for example, polypropylene, high density polyethylene, polyvinylchloride or other injection mouldable thermo plastics.

Figure 4:
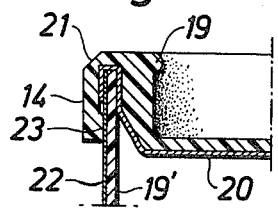
FIG. 4 is a cross-sectional view of part of a container closed by the closure member of FIG. 1.
Figure 5:
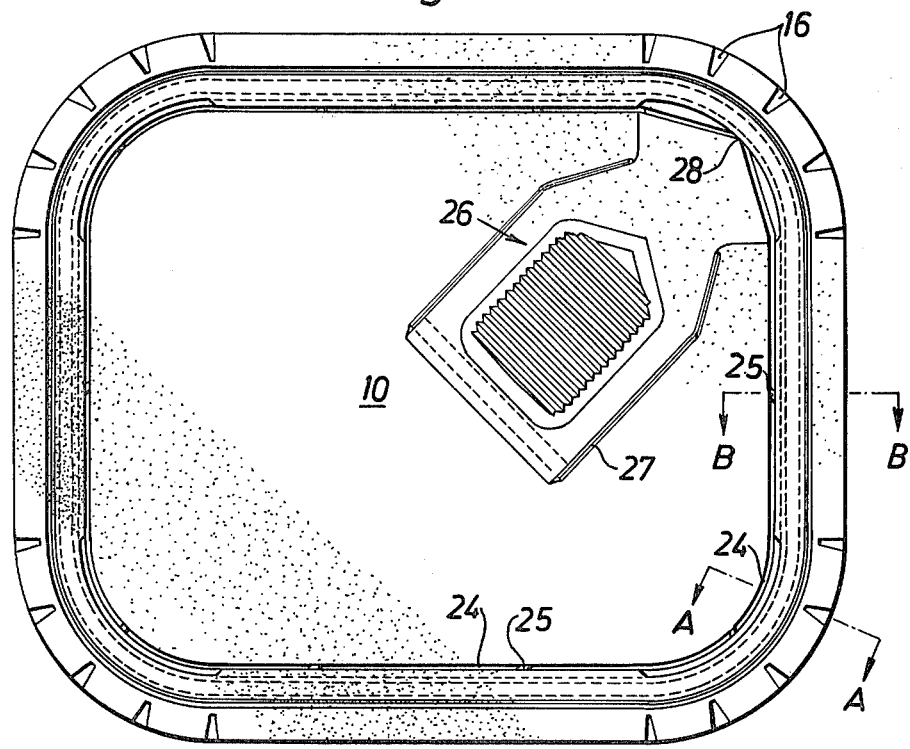
FIG. 5 is a top view of a closure member in accordance with another embodiment of the invention.
Figure 6:
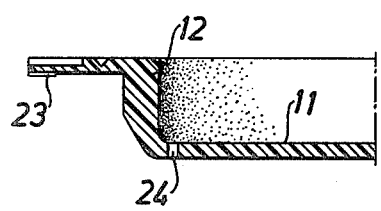
FIG. 6 is a cross-section on the line A—A in FIG. 5.
Figure 7:
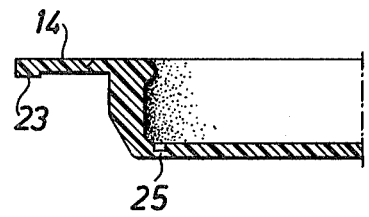
FIG. 7 is a cross-section on the line B—B in FIG. 5.
Figure 8:
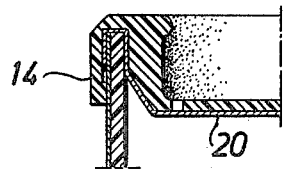
FIG. 8 is a cross-sectional view of part of a container closed by the closure member of FIG. 5.
Figure 14:
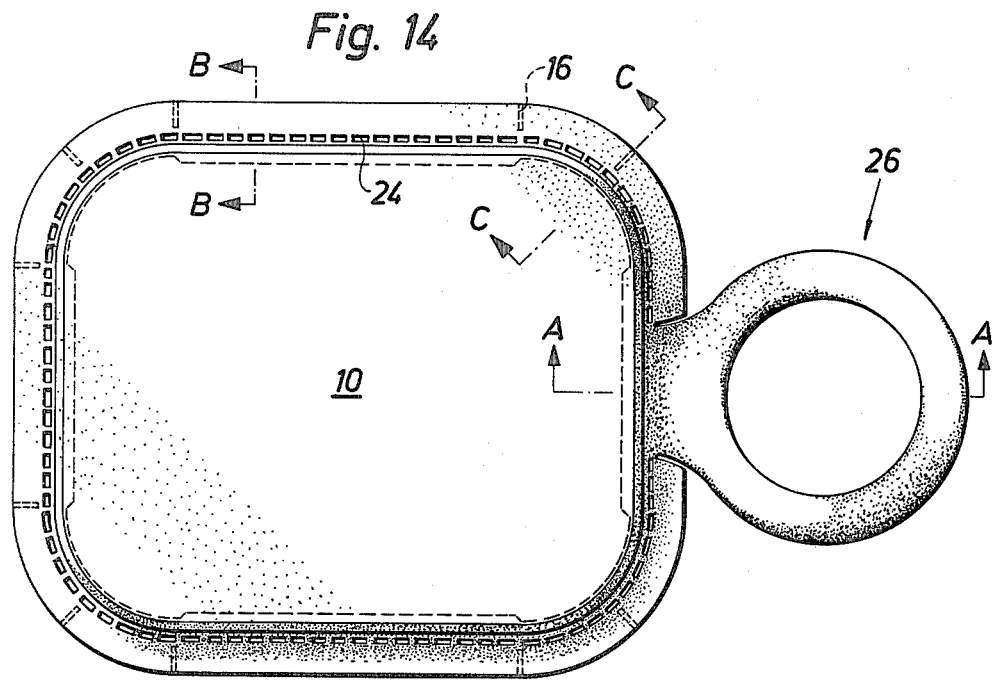
FIG. 14 is a bottom view of a closure member in accordance with a further embodiment of the invention.
Figure 15:
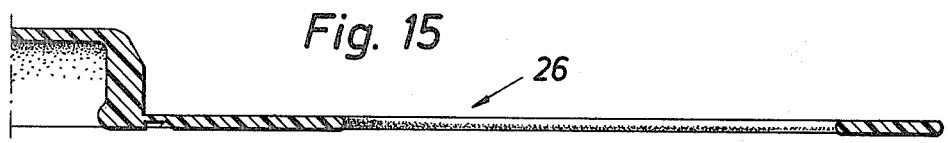
FIG. 15 is a cross-section on the line A—A in FIG. 14.
Figure 16:
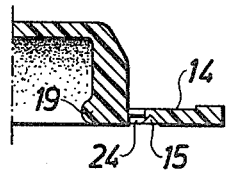
FIG. 16 is a cross-section on the line B—B in FIG. 14.
Figure 17:
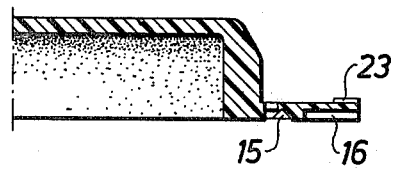
FIG. 17 is a cross-section on the line C—C in FIG. 14.
Figure 18:
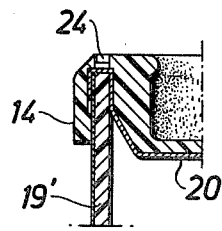
FIG. 18 is a cross-sectional view of part of a container closed by the closure member of FIG. 14.

In FIG. 4 is shown in a partial view how the closure 10 is applied to a tubular container casing 19'. In this case the closure 10 has secured across the bottom thereof a sealing laminate 20 of aluminium coated on both sides thereof with respective layers of polypropylene. This laminate 20 extends past the groove 15. In order to protect the foil 20 and at the same time compensate for the thickness thereof, the outer flange 14 is terminated in a flat circumferential lower rib 23. The container casing 19' preferably also has a sealing laminate 22 which extends substantially to the top edge of the casing. This gives an overlap between the two laminates 20, 22 at the upper edge of the container. The sealing of the closure member to the casing 19' preferably is carried out by high frequency welding in a manner known per se.

When the flange 14 is folded, there are no noticeable strains in the material of the injection moulded closure 10 rim 12. The edge flange 14 easily conforms to the external profile of the casing. Deformations due to shrinkage will not be harmful since the folding of the edge flange is carried out in situ without any intermediate storing time.

The notches 16 at the corner regions of the closure member allow a smooth and tight forming of the edge flange at the corners of the container. The remaining web 17 acts to protect the foil 20 which extends past the groove 15.

In order to illustrate easily openable closures of the invention there are shown in FIGS. 5-8, 9-13 and 14-18, respectively, three different types of easy openable embodiments.

In the embodiment according to FIGS. 5-8, there is a line of weakness 24 arranged along the entire transition region between the closure panel 11 and the circumferential rim 12. Basically, the closure panel 11 is held to the remainder of the closure 10 only by narrow bridges 25. A grip tongue 26 is formed integrally with the closure panel. On the under side thereof the tongue is unconnected to the underlying sealing foil 20 and weakening lines 27 are formed between the closure panel 11 and the grip tongue 26. At the front thereof, the tongue is terminated in a tip 28 known per se. When the tongue 26 is raised, this tip 28 will break through the foil 20 whilst simultaneously removing the closure panel 11 together with the underlying foil from the remainder of the closure by lifting the grip tongue.

Instead of an inner grip tongue, the embodiment according to FIGS. 9-13 may also be used. Here the line of weakness 24 is also located in the transition area between the closure panel 11 and the circumferential rim 12. However, this line 24 joins an outer grip ear 26 via extensions 24'. FIG. 10 shows more in detail how this grip ear is shaped. The rest of the Figures are sections corresponding to the previous ones and therefore no further explanation is necessary.

In FIGS. 14-18, there is shown an alternative similar to that of FIGS. 9-13, but where the line of weakness 24 has been somewhat differently located. It is here located just inside the "V"-shaped groove 15 so that the rim is substantially removed with the closure panel.

In all embodiments, the edge flange has a lower rib 23 for protecting the sealing foil 20 and compensating for the thickness thereof.

It will be appreciated that the invention is not restricted to the specific embodiments of the invention described above and that numerous modifications and variations can be made without departing from the scope of the invention as defined in the following claims. For example, the cross-sectional shape of the container casing and thereby also the shape of the closure member may be varied, and the stacking ribs 19 may be omitted and further the notches 16 and the grooves 15 may be given different shapes to those shown in the drawings.

I claim:

1. A closure member for closing a container opening, said opening being bounded by an upstanding edge of said container, said closure member being formed of plastic material and comprising a central closure panel, a circumferential rim connected to said closure panel for abutting the internal surface of said upstanding edge, a circumferential edge flange connected to said rim and having a circumferential weakened area formed therein about which the edge flange can be folded to abut the outer surface of said upstanding edge, and said edge flange having cut-out portions formed therein to permit the folded edge flange to conform to said outer surface.

2. A closure member as claimed in claim 1 wherein said closure member is injection moulded.

3. A closure member as claimed in claim 2 wherein said material is a thermoplastics material.

4. A closure member as claimed in claim 1 wherein said edge flange is substantially planar and before folding is located substantially parallel to the closure panel.

5. A closure member as claimed in claim 1 wherein said closure panel is countersunk and wherein said rim has at least one circumferentially extending inner rib.

6. A closure member as claimed in claim 5 wherein said rim is of reduced thickness at its lower end to provide an abutment surface for resting against a rib of an underlying closure member in a stack of identical closure members.

7. A closure member as claimed in claim 1 wherein the container-abutting portion of the rim is substantially thicker than the container-abutting portion of the edge flange.

8. A closure member as claimed in claims 1, 4, 5, or 7 wherein said weakened area is a groove formed in said edge flange so that when the flange is folded, the opposed surfaces of said groove form a substantially flat and co-planar configuration.

9. A closure member as claimed in claim 8 wherein said groove has a substantially V-shaped cross-section and wherein said cut-out portions are substantially "V"-shaped notches extending into the edge flange from the outer edge thereof and wherein a thin web of plastic material is connecting said opposed groove surfaces.

10. A closure member as claimed in claim-1 further including a circumferential line of weakness for removal of the closure panel to open said container opening closed by the closure member.

11. A closure member as claimed in claim 10 wherein said circumferential line of weakness for removal of the closure panel is located between the rim and the edge flange.

12. A closure member as claimed in claim 1 further including a sealing lining which covers the bottom of the closure panel and extends beyond the inner edge of the edge flange.

13. A closure member as claimed in claim 12 wherein said edge flange has a circumferential lower rib at its outer edge to compensate for the sealing lining thickness and protect the outer edge of said lining.

14. A closure member as claimed in claim 10 wherein said circumferential line of weakness connects said closure panel and said rim.

* * * * *